United States Patent
Meuninck et al.

(10) Patent No.: US 10,074,149 B2
(45) Date of Patent: *Sep. 11, 2018

(54) WATERMARKED MEDIA CONTENT IN IPTV OR ITV NETWORKS

(71) Applicant: AT&T Intellectual Property I, LP, Atlanta, GA (US)

(72) Inventors: Troy C. Meuninck, Newnan, GA (US); Oleg Kashapov, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 140 days.

This patent is subject to a terminal disclaimer.

(21) Appl. No.: 14/615,623

(22) Filed: Feb. 6, 2015

(65) Prior Publication Data

US 2015/0154726 A1   Jun. 4, 2015

Related U.S. Application Data

(63) Continuation of application No. 14/172,328, filed on Feb. 4, 2014, now Pat. No. 8,984,574, which is a
(Continued)

(51) Int. Cl.
*H04N 7/173* (2011.01)
*G06T 1/00* (2006.01)
(Continued)

(52) U.S. Cl.
CPC ....... *G06T 1/0021* (2013.01); *H04N 7/17318* (2013.01); *H04N 19/467* (2014.11);
(Continued)

(58) Field of Classification Search
CPC .................. H04N 21/467; H04N 21/25833
See application file for complete search history.

(56) References Cited

U.S. PATENT DOCUMENTS 6,411,725 B1    6/2002  Rhoads
6,912,726 B1 *  6/2005  Chen ................. G06F 17/30855
                                                  348/E5.105
(Continued)

FOREIGN PATENT DOCUMENTS

WO          199917536         4/1999

*Primary Examiner* — Olugbenga O Idowu
(74) *Attorney, Agent, or Firm* — Guntin & Gust, PLC; Jay H. Anderson

(57) ABSTRACT

A method that incorporates teachings of the present disclosure may embedding a watermark in media content for presentation at a rendering device using an editor to associate the watermark with one or more metadata pointers that point to additional media content according to an embedded link of the watermark to generate a group of one or more metadata pointers where the watermark includes an embedded link to additional media content used to modify the media content based on a content exchange between the rendering device and a computer. The method may further include storing the group of one or more metadata pointers, where a selection of the watermark invokes access to the altered media content containing the additional media content associated with the watermark, thereby producing the altered media content at the one or more user devices. Other embodiments are disclosed.

20 Claims, 4 Drawing Sheets

Related U.S. Application Data continuation of application No. 13/633,227, filed on Oct. 2, 2012, now Pat. No. 8,683,537, which is a continuation of application No. 12/421,478, filed on Apr. 9, 2009, now Pat. No. 8,302,143.

(51) Int. Cl.

| | | |
|---|---|---|
| *H04N 21/258* | (2011.01) | |
| *H04N 21/44* | (2011.01) | |
| *H04N 21/643* | (2011.01) | |
| *H04N 21/8358* | (2011.01) | |
| *H04N 21/845* | (2011.01) | |
| *H04N 21/858* | (2011.01) | |
| *H04N 19/467* | (2014.01) | |

(52) U.S. Cl.
CPC . *H04N 21/25833* (2013.01); *H04N 21/44004* (2013.01); *H04N 21/64322* (2013.01); *H04N 21/8358* (2013.01); *H04N 21/8455* (2013.01); *H04N 21/858* (2013.01)

(56) References Cited

U.S. PATENT DOCUMENTS

| | | | |
|---|---|---|---|
| 6,973,669 B2* | 12/2005 | Daniels | H04N 5/44543 348/E5.103 |
| 7,095,871 B2 | 8/2006 | Jones | |
| 7,975,062 B2* | 7/2011 | Krikorian | G11B 27/034 709/231 |
| 2002/0162118 A1 | 10/2002 | Levy | |
| 2003/0028873 A1* | 2/2003 | Lemmons | H04N 7/17318 725/36 |
| 2006/0029093 A1 | 2/2006 | Van | |
| 2008/0010653 A1 | 1/2008 | Ollikainen | |
| 2010/0142915 A1* | 6/2010 | McDermott | G11B 27/034 386/343 |

* cited by examiner

WATERMARKED MEDIA CONTENT IN IPTV OR ITV NETWORKS

CROSS-REFERENCE TO RELATED APPLICATIONS

This application is a Continuation of and claims priority to U.S. patent application Ser. No. 14/172,328, filed Feb. 4, 2014, now U.S. Pat. No. 8,984,574, which is a Continuation of and claims priority to U.S. patent application Ser. No. 13/633,227 filed Oct. 2, 2012, now U.S. Pat. No. 8,683,537, which is a Continuation of and claims priority to U.S. patent application Ser. No. 12/421,478 filed Apr. 9, 2009, now U.S. Pat. No. 8,302,143. The contents of each of the foregoing is/are hereby incorporated by reference into this application as if set forth herein in full.

FIELD OF THE DISCLOSURE

The present disclosure relates generally to watermarking of media content and more specifically to a method and apparatus for watermarking media content in an interactive media network.

BACKGROUND

With the advent of various versions of broadband technology, service providers are now able to provide broadband services to residences and commercial establishments over twisted pair lines. Broadband services can include Internet service, telephony, and interactive Television (iTV). In the case of iTV services, the service provider typically provides access to media stored on a backend server as provided by a distribution source. The media may be static and available upon request or dynamic in nature where the media may represent scheduled content which may be more temporary in nature.

Existing media content can include watermarks, but such watermarks are merely used to designate a source or an origin of the content. Such watermarks are typically embedded by the producers of the original content.

DETAILED DESCRIPTION

One embodiment of the present disclosure can entail a method at a set top box (STB) comprising altering media content from a procured channel in an Internet Protocol Television (IPTV) network where the altered media content includes a watermark and the watermark comprises an embedded link to additional media content, storing the altered media content having the watermark and the additional media content, creating a library of metadata pointers to the altered media content and the additional media content, and sending the library of metadata pointers to a server, wherein the server presents a media on demand (MoD) option for access to the altered media content to users on the IPTV network and wherein a selection of the watermark invokes access to the additional media content.

Another embodiment of the present disclosure can entail a computer-readable storage medium having computer instructions to embed a watermark in media content for presentation at a rendering device operating in an interactive television (iTV) network where the watermark comprises an embedded link to additional media content, store the embedded link in a library of pointers, wherein a selection of the watermark invokes access to the additional media content which modifies the media content associated with the watermark, thereby producing altered media content.

Yet another embodiment of the present disclosure can entail a media processor such as a set top box having a controller to receive media content from an iTV network, wherein the media content contains a watermark having an embedded link to access additional content, and access the additional content responsive to a detected selection of the watermark.

Yet another embodiment of the present disclosure can entail a server having a controller to manage a library of pointers to altered media content where the altered media content is created by embedding a watermark in media content presentable at a network element of an interactive media network, and enable the network element to access additional media content responsive to detecting a selection of the watermark at the network element.

Figure 1:
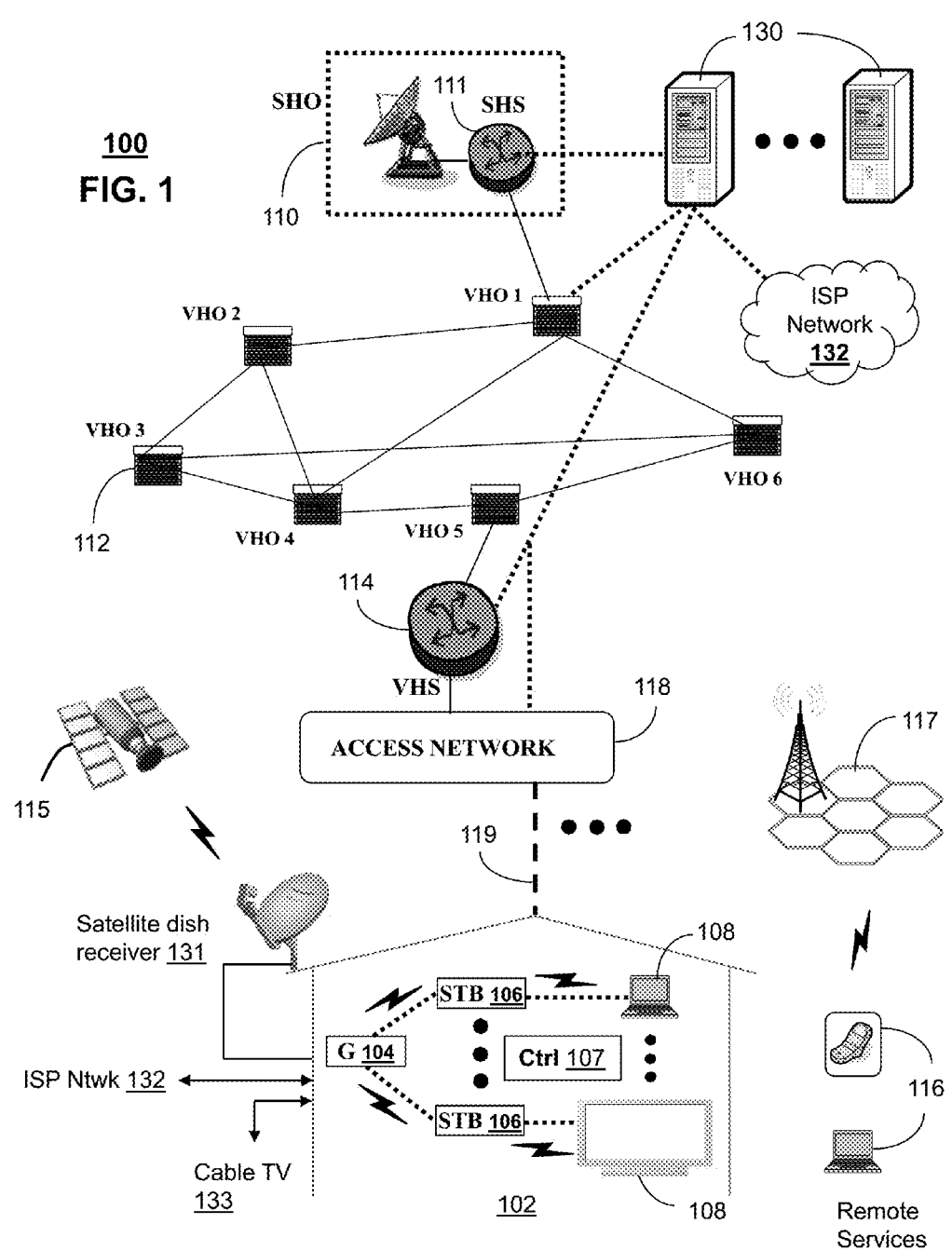
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130). The server 130 can use common computing and communication technology to perform the function of adjusting between a video quality and an audio quality in a Interactive Television (iTV) or an IPTV presentation in response to a user selection where the audio quality and the video quality are adjusted at the expense of each other as will be further described with respect to FIG. 4.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
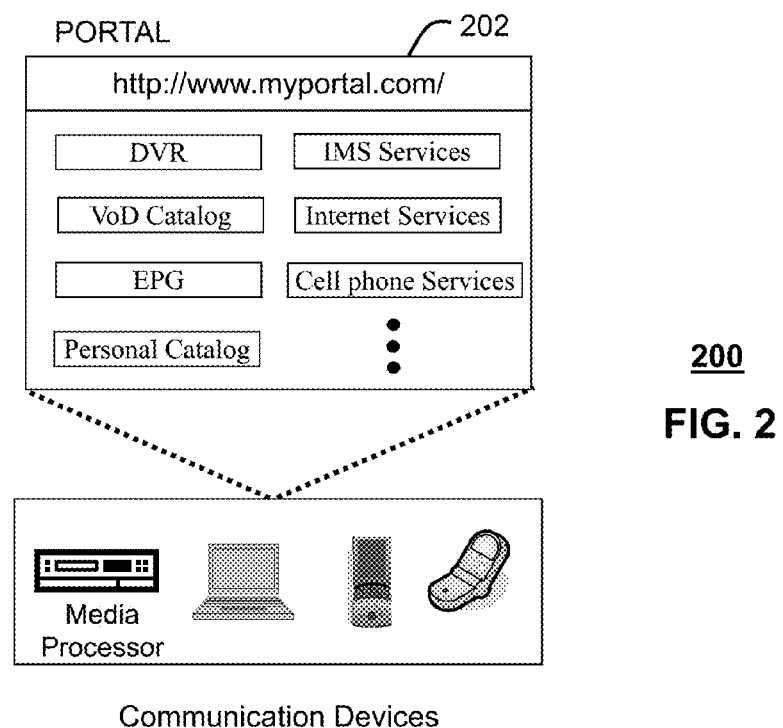
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on. The portal 202 can also be used to allocate the relative quality settings for video quality and audio quality as further described herein. Note that the video and quality settings can also be set at the media processor or set top box in other embodiments. In yet other embodiments, the quality settings can be set at either the media processor or the portal (or server).

Figure 3:
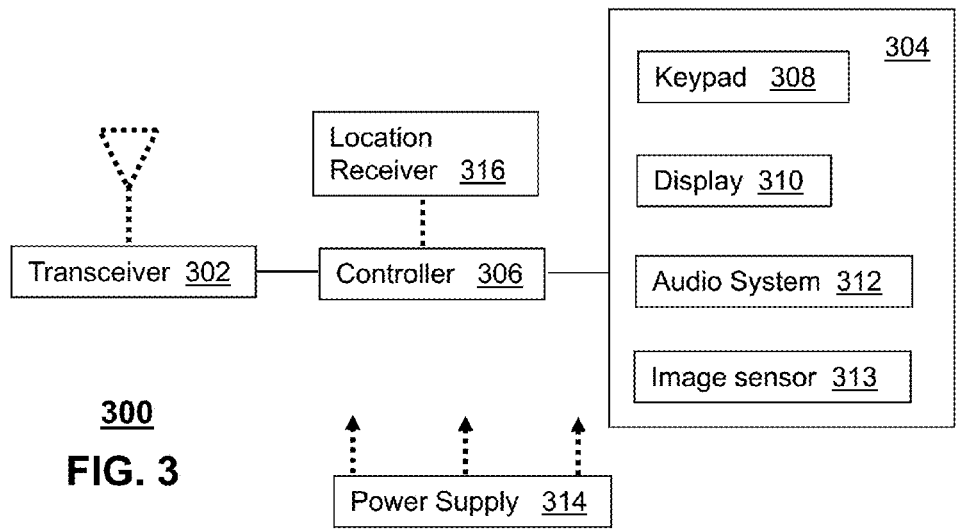
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
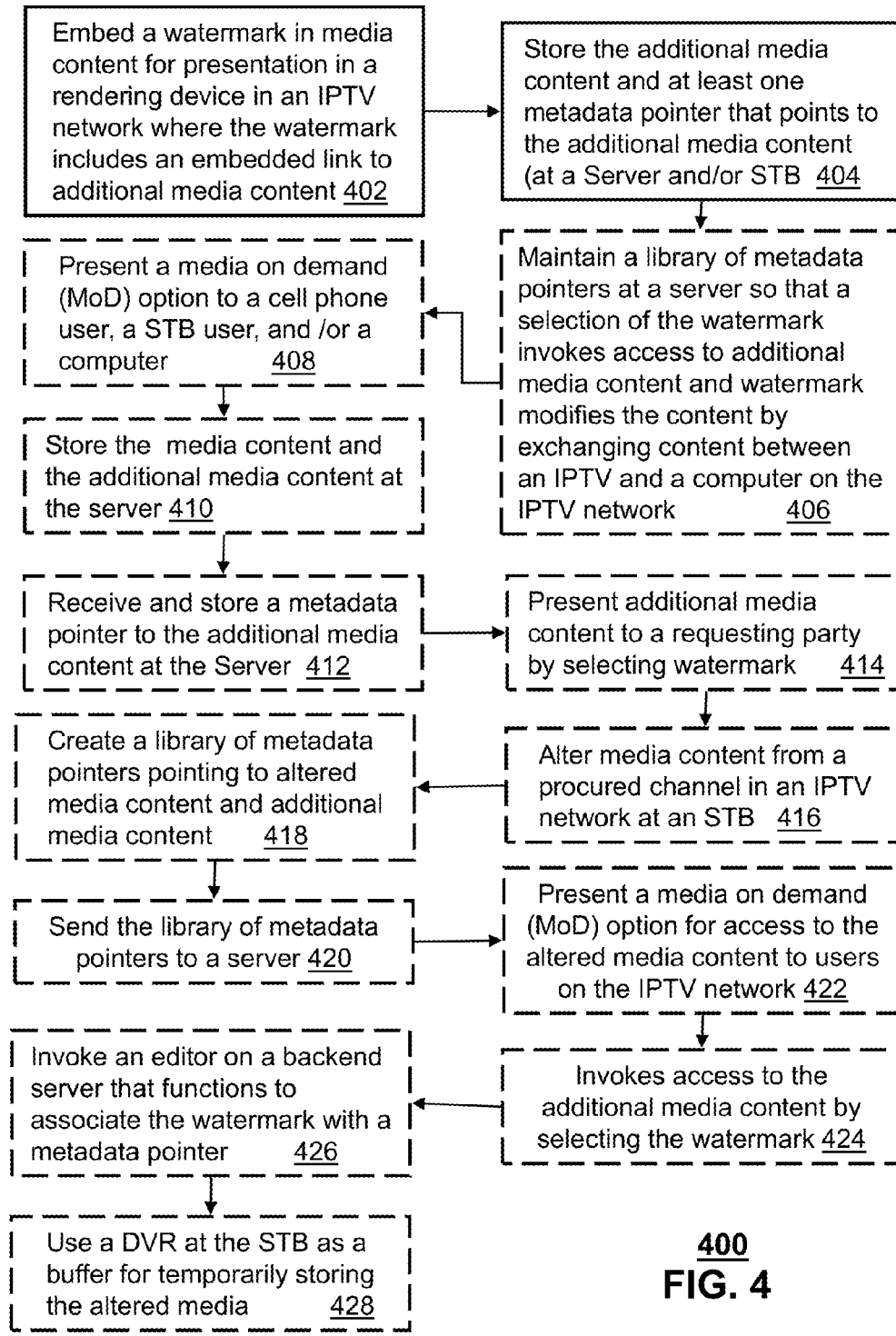
FIG. 4 depicts an illustrative embodiment of a method operating in portions of the communication system of FIG. 1.

FIG. 4 depicts an illustrative method 400 that operates in portions of the communication system of FIG. 1 such as at a media processor or set top box. Method 400 can begin at 402 in which a watermark is embedded in media content for presentation in a rendering device in an IPTV network where the watermark includes an embedded link to additional media content. At 404, the method can store the additional media content and at least one metadata pointer that points to the additional media content. A library of metadata pointers can be maintained at a server at 406 such that a selection of the watermark invokes access to the additional media content and the watermark modifies the media content by exchanging media content between an IPTV and a computer on the IPTV network. The media content and the additional media content can be static media or dynamic media that was presented live or in a scheduled format and altered with portions of the dynamic media replaced with alternative live or scheduled content. Note that the media content can be stored at a STB and a media on demand (MoD) option can be presented to a cell phone user, a STB user, and a computer user at 408. The media content and the additional media content can also be stored at the server at 410. At 412, the server can receive and store a metadata pointer to the additional media content and at 414 the additional media content can be presented to a requesting party by selecting the watermark.

In another aspect, a method can entail a method at a set top box of altering media content from a procured channel in an IPTV network at 416 where the altered media content includes a watermark and the watermark comprises an embedded link to additional media content. As noted above, the altered media content having the watermark as well as the additional media can be stored. A library of metadata pointer can be created where the pointers point to the altered media content and the additional media content at 418. The library of metadata pointers can be sent to a server at 420 and at 422 the server can present a media on demand (MoD) option for access to the altered media content to users on the IPTV network. Further, a selection of the watermark at 424 invokes access to the additional media content. At 426, the method can invoke an editor on a backend server that functions to associate the watermark with a metadata pointer. Note that the altered media content can be stored in at least one among the STB or the backend server and a MoD option with the library of metadata pointers is presented to a target user. The MoD option can present the altered media content in the form of audio, text, still images, or video. The MoD option can be presented to any among a cell phone user (at a cell phone), a STB user (at a presentation device coupled to the STB), or a computer user. The metadata pointer associated with the watermark points to content in an appropriate format formatted for a targeted user of a rendering device among a cellular phone, a computer, or a STB. The method at 428 can also use a digital video recorder (DVR) at the STB as a buffer for temporarily storing the altered media content.

In summary, a method is disclosed in which media content is watermarked by the provider of the content, where the provider can be a user on the IPTV or iTV system that has the means to edit and exchange content between a PC and an IPTV for example as discussed above. The watermark can represent a hidden actionable attribute which the content provider has added to the media content. An actionable attribute can represent embedded XML hypertext in the selected media content which can invoke a website redirection. For example, an image can include a hypertext watermark which when exchanged according to the embodiments described above, will invoke a website redirection when the recipient of the content selects the image. The redirected site can present related content and/or advertisements managed by the content provider of the image. The content provider can be a carrier, a third party content provider, or any among the users on the IPTV or iTV network. Thus, a user on an IPTV network can, for example, add the watermark to a static or dynamic form of content to serve as a link to additional content that can be presented in conjunction with the current media content being viewed. Thus, a party selecting the content can invoke an editor on a backend server to associate a watermark with the metadata. Subsequently when the content is requested, the backend server embeds the watermark in the content before it conveys it to the requesting party.

Upon reviewing the aforementioned embodiments, it would be evident to an artisan with ordinary skill in the art that said embodiments can be modified, reduced, or enhanced without departing from the scope and spirit of the claims described below. For example, the modification of the media can be done with exchanging static media content in an IPTV environment or website. Static in the present context can mean media content that is not temporary in nature like media content presented according to a given schedule (such as a TV program played from 8-9 pm) and no longer available after the schedule. Static media content can represent for example media content available 24/7 on a website or on an IPTV or iTV channel. For example, an image, video, audio content, text or otherwise presented on a web page or IPTV channel on an ongoing basis can be considered static media content. Select static (or dynamic) media content in this context can be transferred between media rendering devices: IPTV→PC, PC→IPTV to facilitate modification or alteration of the media. Pointers in the form of metadata can be used to not only point to the altered content, but can also be used to effectuate exchanges. A user can for example select media content (audio, video, still image, etc.) with a mouse and request a transfer by way of a right click menu selection. A backend server can detect the request, extract metadata from the source (URL and URI) and effectuate a transfer by notifying a targeted device. The targeted device can prompt a user to accept or reject the transfer of the proposed media content. With this process, a backend server can be programmed to store a collection of metadata pointers to a multitude of media content for a number of subscribers without having to store the content.

Embodiments herein can also be adapted to handle a multi-user household. For example, each user can have their own STB or an STB can be shared. In the former case a GUID (Global Unique Identifier) of the STB can be used to associate a user of the STB to a PC (by account name on the PC, PC name if exclusively used by the same person, static IP address if available, or some other form of unique credentials). In the situation where more than one user shares the same STB, an administrator of the STB (e.g., a parent) can establish user accounts on the STB and identify the users by name, profile, and so on. The profile can identify a PC account to associate with the user for purposes of media content exchanges. The association can be with a PC account of the same user, or other users (for example, friends and family). When the backend server notifies an STB of a proposed media content exchange, the notice can include an identification of the user proposing the exchange which can then be matched to a profile of a select STB account. Pausing and buffering media content presented by the STB can also be implemented to avoid service interruptions during the notification process. The above exchange can also be initiated from the IPTV to the PC.

Similarly, dynamic media content can be altered. Dynamic media can represent scheduled content (e.g., TV shows, radio programs, etc.) which are temporary in nature. In this context, a metadata pointer to a scheduled program is only useful while the program is active. A DVR, for example, can be used to buffer the content and thereby change the nature of the content to one that is static. For instance, suppose a user sees an image in a live or scheduled TV program of interest. The user can pause the program, rewind to the point of interest, and then select the image to initiate an exchange to another device, or the STB itself. The STB can perform this function by storing the selected image in a DVR, which can be configured to hold a library of exchangeable media content. The STB can then transmit to a backend server a metadata pointer to the media content stored in the DVR. The backend server can then inform the targeted device (e.g., a PC, cell phone, etc.) of the proposed media content exchange, and store the metadata when authorized by the recipient user. From this point, when the targeted device wants to access the media content, it signals the backend server, which then retrieves it from the DVR according to the stored metadata, and conveys it to the requesting device. These techniques can be applied to video, audio, text, still images, or combinations thereof. Further note that the alterations or modifications are not just limited to exchanges, but can also include modification of content that can be achieved with a media editor for example.

In yet another aspect, portions of a media program can be altered. For example, suppose a user is watching a baseball game on ESPN, but does not like the sports announcers. Suppose the user likes the sports announcers broadcasting on an AM radio channel which is accessible over the Internet or a radio receiver built-in to an entertainment system accessible by the STB. Under circumstances like these, the user can select the media program in question (the ESPN program) with the mouse pointer and use a right click process described to request an alteration of the program. The STB can provide an option to alter the video, or the audio. In this instance, the user chooses to alter the audio. The user can then communicate to the STB a desire to replace the audio portion of the program with another source. The source can be specified at the STB by browsing the Internet (or other media content source) by way of the STB and selecting an audio source to replace the audio portion of the ESPN program (i.e., the AM channel). Such modified programming can then be offered as a Media on Demand option to other users on the IPTV or iTV network via the metadata pointers detailed above.

Other suitable modifications can be applied to the present disclosure without departing from the scope of the claims below. Accordingly, the reader is directed to the claims section for a fuller understanding of the breadth and scope of the present disclosure.

Figure 5:
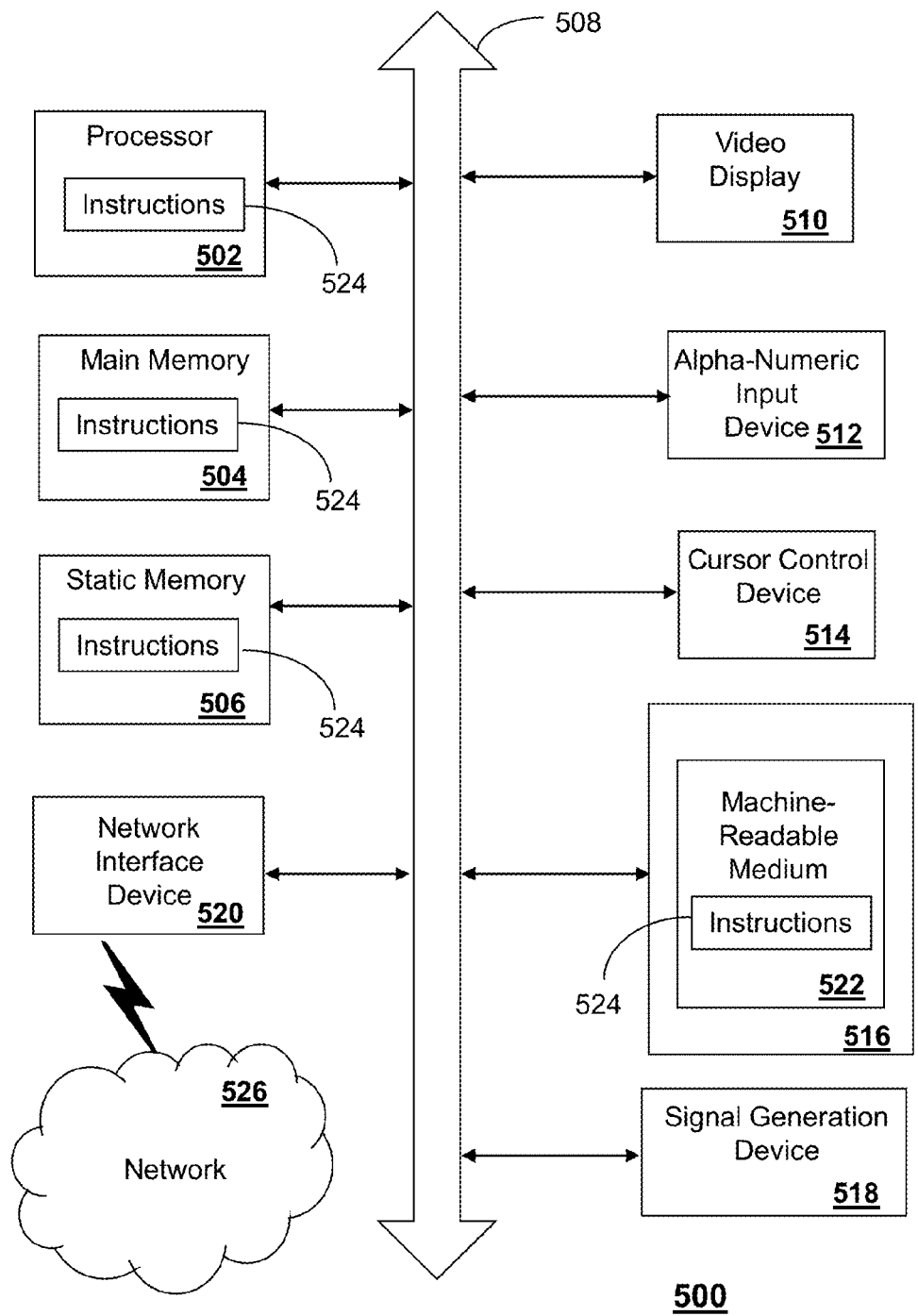
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure allows the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable medium comprising executable instructions that, when executed by a processing system including a processor, facilitate performance of operations, comprising:
   associating a watermark embedded in media content with a first pointer that points to additional media content;
   receiving a selection of the watermark embedded in the media content;
   accessing according to the first pointer the additional media content responsive to the selection of the watermark,
      wherein, responsive to the selection of the watermark, the additional media content replaces portions of the media content by a content exchange between a media device in an interactive media network and a computing device coupled to the interactive media network, thereby forming altered media content;
   storing the altered media content in a buffer at the media device;
   creating a second pointer that points to the altered media content; and
   sending a library of pointers comprising both the first pointer and the second pointer to a server device for use in presentation of a media on demand option at a user device for accessing the additional media content and the altered media content,
   wherein the server device maintains the library of pointers and does not store the altered media content, and
   wherein the server device facilitates the content exchange by notifying the user device, the user device providing in response to the notifying a prompt to accept or reject transfer of the additional media content.

2. The non-transitory machine-readable medium of claim 1, wherein the selection of the watermark comprises a user selection of the watermark.

3. The non-transitory machine-readable medium of claim 1, wherein the media content comprises on demand media content.

4. The non-transitory machine-readable medium of claim 1, wherein the watermark comprises hypertext for initiating a website redirection when the watermark is selected.

5. The non-transitory machine-readable medium of claim 1, wherein the additional media content comprises live media content.

6. The non-transitory machine-readable medium of claim 1, wherein the additional media content comprises prerecorded media content.

7. The non-transitory machine-readable medium of claim 1, wherein the media on demand option presents the altered media content as audio content or video content.

8. The non-transitory machine-readable medium of claim 1, wherein the user device comprises a communication device.

9. A device, comprising:
a processing system including a processor; and
a memory that stores executable instructions that, when executed by the processing system, facilitate performance of operations comprising:
associating a watermark embedded in media content with a first pointer that points to additional media content;
receiving a selection of the watermark embedded in the media content;
accessing according to the first pointer the additional media content responsive to the selection of the watermark,
wherein, responsive to the selection of the watermark, the additional media content replaces portions of the media content by a content exchange between a media device in an interactive media network and a computing device coupled to the interactive media network, thereby forming altered media content;
storing the altered media content in a buffer at the media device;
creating a second pointer that points to the altered media content; and
sending a library of pointers comprising both the first pointer and the second pointer to a server device for use in presentation of a media on demand option at a user device for accessing the additional media content and the altered media content,
wherein the server device maintains the library of pointers and does not store the altered media content, and
wherein the server device facilitates the content exchange by notifying the user device, the user device providing in response to the notifying a prompt to accept or reject transfer of the additional media content.

10. The device of claim 9, wherein the selection of the watermark comprises a user selection of the watermark.

11. The device of claim 9, wherein the media content comprises on demand media content.

12. The device of claim 9, wherein the watermark comprises hypertext for initiating a website redirection when the watermark is selected.

13. The device of claim 9, wherein the additional media content comprises live media content.

14. The device of claim 9, wherein the additional media content comprises prerecorded media content.

15. A method comprising:
associating, by a processing system including a processor, a watermark embedded in media content with a first pointer that points to additional media content;
receiving, by the processing system, a selection of the watermark embedded in the media content;
accessing, by the processing system, according to the first pointer the additional media content responsive to the selection of the watermark,
wherein, responsive to the selection of the watermark, the additional media content replaces portions of the media content by a content exchange between a media device in an interactive media network and a computing device coupled to the interactive media network, thereby forming altered media content;
storing, by the processing system, the altered media content in a buffer at the media device;
creating, by the processing system, a second pointer that points to the altered media content; and
sending, by the processing system, a library of pointers comprising both the first pointer and the second pointer to a server device for use in presentation of a media on demand option at a user device for accessing the additional media content and the altered media content,
wherein the server device maintains the library of pointers and does not store the altered media content, and
wherein the server device facilitates the content exchange by notifying the user device, the user device providing in response to the notifying a prompt to accept or reject transfer of the additional media content.

16. The method of claim 15, wherein the selection of the watermark comprises a user selection of the watermark.

17. The method of claim 15, wherein the media content comprises on demand media content.

18. The method of claim 15, wherein the watermark comprises hypertext for initiating a website redirection when the watermark is selected.

19. The method of claim 15, wherein the additional media content comprises live media content.

20. The method of claim 15, wherein the additional media content comprises prerecorded media content.

* * * * *